United States Patent
Sirrenberg et al.

[11] 3,862,277
[45] Jan. 21, 1975

[54] PREPARATION OF O,O-DIALKYL-O-(2,2-DICHLOROVINYL)-THIONOPHOSPHORIC ACID ESTERS

[75] Inventors: Wilhelm Sirrenberg, Sprockhovel/I.W.; Reimer Colln, Wuppertal-Elberfeld, both of Germany

[73] Assignee: Bayer Aktiengesellschaft, Leverkusen, Germany

[22] Filed: July 24, 1973

[21] Appl. No.: 382,235

[30] Foreign Application Priority Data
Aug. 8, 1972  Germany............................ 2238921

[52] U.S. Cl.................. 260/986, 260/957, 260/970, 424/219
[51] Int. Cl............................ C07f 9/16, A01n 9/36
[58] Field of Search..................... 260/970, 957, 986

[56] References Cited
UNITED STATES PATENTS
2,899,455  8/1959  Coover et al. .................. 260/970 X FOREIGN PATENTS OR APPLICATIONS
744,360  2/1960  Great Britain...................... 260/957
747,824  4/1956  Great Britain...................... 260/957

Primary Examiner—Anton H. Sutto
Attorney, Agent, or Firm—Burgess, Dinklage & Sprung

[57] ABSTRACT

A process for the production of an O,O-dialkyl-O-(2,2-dichlorovinyl)-thionophosphoric acid ester of the formula

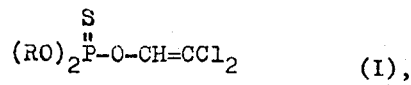

(I), in which
R is methyl or ethyl,
in which an O,O-dialkylthiophosphite of the formula

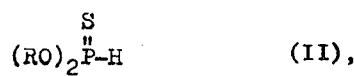

(II), is reacted with chloral in the presence of a catalytic amount of an amine, with subsequent reaction with an equimolar amount of an alkali metal alcoholate at a temperature below 40°C.

10 Claims, No Drawings

PREPARATION OF O,O-DIALKYL-O-2,2-DICHLOROVINYL)-THIONOPHOSPHORIC ACID ESTERS

The present invention relates to an unobvious process for the production of certain known insecticidal and acaricidal O,O-dialkyl-O-(2,2-dichlorovinyl)-thionophosphoric acid esters.

It is known that O,O-dialkyl-O-(2,2-dichlorovinyl)-thionophosphoric acid esters are obtained when O-(2,2-dichlorovinyl)-thionophosphoric acid ester dichloride is reacted with alcoholates.

However, this process suffers from a number of disadvantages. Thus, firstly the O-(2,2-dichlorovinyl)-thionophosphoric acid ester dichloride required as the starting material is only obtainable from the corresponding oxygen compound and phosphorus pentasulfide at high temperatures (about 150°C) with very poor yields (approximately 30 percent of theory). Secondly, in the reaction of the dichloride with alcoholates yields of only about 50 percent of theory are obtained, so that for the two stages a total yield of approximately 15 percent results. The utility of the process is therefore limited (see German Offenlegungsschrift (German Published Specification) 2,150,108).

The present invention provides a process for the production of an O,O-dialkyl-O-(2,2-dichlorovinyl)-thionophosphoric acid ester of the general formula

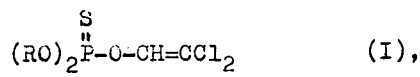

in which
R is methyl or ethyl,
in which an O,O-dialkylthiophosphite of the general formula

in which
R has the above-mentioned meaning,
is reacted with chloral in the presence of a catalytic amount of an amine, with subsequent reaction with an equimolar amount of an alkali metal alcoholate at a temperature below 40°C.

It must be described as distinctly surprising that under these reaction conditions the desired end products - which it was hitherto only possible to produce according to the one process disclosed in the above-mentioned Offenlegungsschrift (published specification) - can be obtained rapidly, simply, in high yields and in good purity, because it is known that Pelchowitz (see J. Chem. Soc. 1961, page 241) obtained, from O,O-dialkyl-thiophosphites and chloral at 60°C, the O,O-dialkyl-S-(2,2-dichlorovinyl)-thiolphosphoric acid esters and not the corresponding thiono compounds.

The process according to the invention has a number of advantages. Mention should be made, in the first place, of the simplicity with which it can be carried out industrially. A further advantage is the reduction in the number of reaction stages. Further factors which must be described as advantageous are the ready availability of the starting materials, the absence of side reactions, the very good yields and the high purity of the desired end products.

If O,O-dimethylthiophosphite, chloral and sodium methylate are used as starting materials, the course of the reaction can be represented by the following equation:

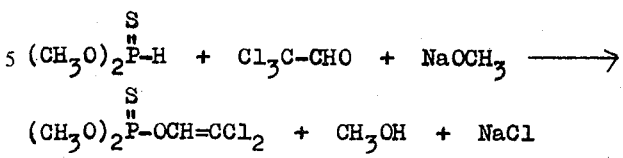

The starting compounds of the formula (II) can be obtained easily, even on an industrial scale.

The process according to the invention is preferably carried out with conjoint use of suitable solvents. As such, practically all inert organic solvents can be used, especially hydrocarbons, such as aliphatic, cycloaliphatic and aromatic hydrocarbons of up to about 20 carbon atoms, e.g., benzene, toluene, xylene and petroleum ether, ethers, for example lower alkyl and cyclic ethers such as diethyl ether, dioxane and tetrahydrofuran, and also lower aliphatic alcohols, such as the alkanols methanol and ethanol.

Preferably, tertiary aliphatic amines, for example alkylamines such as triethylamine, are used as the added amine, but cyclo-aliphatic, aromatic and other basic amino compounds are also suitable.

The alcoholates employed are preferably the alkali metal alcoholates of lower aliphatic alcohols, for example potassium methylate or ethylate or sodium methylate or ethylate.

The reaction according to the invention only follows the desired course if a temperature below 40°C is maintained. Preferably, the reaction is carried out at between 15° and 20°C.

The reaction is in general carried out under normal pressure.

To carry out the process according to the invention, the O,O-dialkylthiophosphite, optionally in a suitable diluent and with the addition of at least 1 mole percent of one of the above-mentioned amines, is first taken, and an equimolar amount of chloral is added, while maintaining a reaction temperature below 40°C, preferably of 15° to 20°C. Thereafter the mixture is treated with an equimolar amount of alkali metal alcoholate, preferably in the form of an alcoholic solution, during which the temperature of the reaction mixture must be kept below 40°C, preferably at 15° to 20°C.

The reaction products (I) are isolated by removing the salt-like precipitate which has separated out, and removing the solvent. If a purification is desired, it is carried out according to customary methods, for example by washing and distillation.

The compounds obtainable according to the process of the invention are known to be valuable insecticides and acaricides (see, for example, German Offenlegungsschrift (German Published Specification) 2,150,108), for example in the field of plant protection.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g., benzene, toluene, xylene, alkyl naphthalenes, etc.), halogenated, especially chlorinated, aromatic hydrocarbons (e.g., chlorobenzenes, etc.), cycloalkanes (e.g., cyclohexane, etc.), paraffins (e.g., petroleum or mineral oil fractions), chlorinated aliphatic hydrocarbons (e.g., methylene chloride, chloroethylenes, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g., dimethyl formamide, etc.), sulfoxides (e.g., dimethyl sulfoxide, etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alimina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or rodenticides, fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.001–2 percent, preferably 0.01–0.5 percent by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.001–95 percent, and preferably 0.01–95 percent, by weight of the mixture.

The active compounds can also be used in accordance with the well known ultra-low-volume process with good success i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g. about 20–100 percent by weight of the active compound.

The instant formulations or compositions are applied in the usual manner, for instance by spraying, atomizing, vaporizing, scattering, dusting, watering, squirting, sprinkling, pouring, fumigating, dressing, encrustation, and the like.

It will be realized, of course, that the concentration of the particular active compound utilized in admixture with the carrier vehicle will depend upon the intended application. Therefore, in special cases it is possible to go above or below the aforementioned concentration ranges.

EXAMPLE 1

$$(CH_3O)_2\overset{S}{\overset{\|}{P}}\text{-O-CH=CCl}_2 \qquad (1)$$

0-(2,2-Dichlorovinyl)-0,0-dimethylthionophosphate 631 g of dimethylthiophosphite were dissolved in 2 l of toluene. 10 g of triethylamine were added to this solution and thereafter 750 g of chloral were added dropwise over the course of 30 minutes. While doing so, the internal temperature was kept at between 15° and 20°C by external cooling. Thereafter a solution of sodium methylate in methanol, containing 5 moles of sodium methylate, was added dropwise to the reaction mixture at 15° to 20°C. The batch was stirred for 1 hour at 20°C and was subsequently washed with 2l of water, to which 30 ml of concentrated hydrochloric acid had been added, and thereafter washed twice more, with 2 l of water at a time. The organic phase was dried over 250 g of sodium sulfate. 50 g of active charcoal were stirred in additionally. After drying, the solution was filtered and concentrated under reduced pressure, and 1,100 g (93 percent of theory) of the compound of the above structure were obtained in the form of a pale yellow-colored oil.

The crude product could be purified by distillation. It boiled under a pressure of 2 mm Hg at 76° to 80°C; the refractive index was $n_D^{22} = 1.4964$.

The product was identified by the NMR spectrum and by the IR spectrum.

EXAMPLE 2

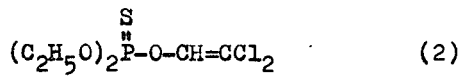

O-(2,2-Dichlorovinyl)-O,O-diethylthionophosphate 772 g of chloral were added dropwise over the course of 30 minutes, at 15° to 20°C, to a solution of 771 g of diethylthiophosphite and 10 g of triethylamine in 2 l of toluene. Thereafter, a solution of 360 g of sodium ethylate in 1.2 kg of ethanol was added dropwise over the course of half an hour at the indicated temperature and the mixture was stirred for a further hour at 20°C to complete the reaction. The batch was washed with 2 l of water, with the addition of 30 ml of concentrated hydrochloric acid. After the first wash, the reaction mixture was diluted with ½ l of toluene. The subsequent second wash was carried out with 2 l of water to which ½ l of saturated sodium chloride solution had been added for better phase separation. The organic phase was dried over 250 g of sodium sulfate, at the same time stirring in 50 g of active charcoal. After drying, the solution was filtered, the solvent was distilled off under reduced pressure and the oily residue was subjected to a vacuum of 2 mm Hg for 30 minutes at an external temperature of 60°C. The refractive index of the crude product was $n_D^{21} = 1.4860$. 999.5 g (75.5 percent of theory) were obtained.

The crude product could be purified by distillation. It boiled at 89° to 91.5°C and had a refractive index $n_D^{18.5}$ of 1.4875.

It will be appreciated that the instant specification and examples are set forth by way of illustration and not limitation, and that various modifications and changes may be made without departing from the spirit and scope of the present invention.

What is claimed is:

1. A process for the production of an O,O-dialkyl-O-(2,2-dichlorovinyl)-thionophosphoric acid ester of the formula

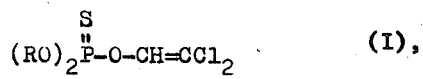

in which
R is methyl or ethyl
in which an O,O-dialkylthiophosphite of the formula

is reacted with chloral in the presence of a catalytic amount of an amine, with subsequent reaction with an equimolar amount of an alkali metal alcoholate at a temperature below 40°C.

2. A process according to claim 1, in which the reaction is carried out at from 15° to 20°C.

3. A process according to claim 1, in which the reaction is carried out in the presence of an inert organic solvent.

4. A process according to claim 3, in which the solvent is a hydrocarbon, an ether or a lower aliphatic alcohol.

5. A process according to claim 1, in which the amine is a tertiary aliphatic amine.

6. A process according to claim 1, in which at least 1 mole percent of the amine is employed per mole of the dialkylthiophosphite.

7. A process according to claim 1, in which the alkali metal alcoholate is sodium methylate or ethylate or potassium methylate or ethylate.

8. A process according to claim 2, in which the reaction is effected in a hydrocarbon, an ether or a lower aliphatic alcohol, the alkali metal alcoholate is sodium methylate or ethylate or potassium methylate or ethylate and the amine is a tertiary aliphatic amine employed in at least 1 mole percent of the dialkylthiophosphite.

9. A process according to claim 8, in which the dialkylthiophosphite is dimethylthiophosphite.

10. A process according to claim 8, in which the dialkylthiophosphite is diethylthiophosphite.

* * * * *